United States Patent
Hu et al.

(10) Patent No.: US 7,213,395 B2
(45) Date of Patent: May 8, 2007

(54) HYBRID CATALYST SYSTEM FOR EXHAUST EMISSIONS REDUCTION

(75) Inventors: Haoran Hu, Novi, MI (US); Thomas Stover, Milford, MI (US)

(73) Assignee: Eaton Corporation, Cleveland, OH (US)

( * ) Notice: Subject to any disclaimer, the term of this patent is extended or adjusted under 35 U.S.C. 154(b) by 57 days.

(21) Appl. No.: 10/890,642

(22) Filed: Jul. 14, 2004

(65) Prior Publication Data
US 2006/0010857 A1    Jan. 19, 2006

(51) Int. Cl.
*F01N 3/00* (2006.01)

(52) U.S. Cl. .......................... 60/286; 60/295; 60/297; 60/301; 60/303; 48/197 R; 48/198.7; 423/239.1; 423/243.06

(58) Field of Classification Search .......... 60/274, 60/285, 286, 295, 297, 301, 303, 324; 48/197 R, 48/198.7; 423/237, 239.1, 243.06
See application file for complete search history.

(56) References Cited

U.S. PATENT DOCUMENTS

| | | | |
|---|---|---|---|
| 4,751,054 A | 6/1988 | Watanabe | |
| 5,125,231 A | 6/1992 | Patil et al. | |
| 5,587,137 A | 12/1996 | Swaroop et al. | |
| 5,778,667 A | 7/1998 | Kinugasa et al. | |
| 5,833,932 A | 11/1998 | Schmelz | |
| 5,910,097 A | 6/1999 | Boegner et al. | |
| 6,105,365 A | 8/2000 | Deeba et al. | |
| 6,109,024 A | 8/2000 | Kinugasa et al. | |
| 6,119,452 A | 9/2000 | Kinugasa et al. | |
| 6,176,078 B1 * | 1/2001 | Balko et al. ................ | 60/274 |
| 6,176,079 B1 | 1/2001 | Konrad et al. | |
| 6,334,986 B2 | 1/2002 | Gieshoff et al. | |
| 6,338,244 B1 | 1/2002 | Guenther et al. | |
| 6,354,079 B1 | 3/2002 | Choi et al. | |
| 6,497,092 B1 | 12/2002 | Theis | |
| 6,560,958 B1 | 5/2003 | Bromberg et al. | |
| 6,662,553 B2 | 12/2003 | Patchett et al. | |

(Continued)

FOREIGN PATENT DOCUMENTS

DE    103 15 593 A1    10/2004

(Continued)

OTHER PUBLICATIONS

International Search Report for Application No. PCT/IB2005/002011.

*Primary Examiner*—Binh Q. Tran
(74) *Attorney, Agent, or Firm*—Paul V. Keller

(57) ABSTRACT

One aspect of the invention relates an exhaust treatment system having an SCR reactor following a NOx adsorber. Syn gas is used to regenerate the NOx adsorber. Another aspect relates to an LNT/SCR provided with an ammonia source separate from the LNT. A further aspect relates to a system comprising first and second LNTs and one or more SCRs downstream of the LNTs. A still further aspect relates to a device comprising first and second NOx adsorbers contained in a single housing. Another aspect relates to coating a surface of a moving part in an exhaust system with an oxidation catalyst to mitigate fouling. Additional aspects of the invention relate to strategies for controlling one or more of the time to initiate a regeneration cycle, the time to terminate a regeneration cycle, and the reductant injection rate during regeneration of LNT/SCR exhaust treatment systems.

10 Claims, 3 Drawing Sheets

U.S. PATENT DOCUMENTS

| | | | |
|---|---|---|---|
| 6,698,188 | B2 | 3/2004 | Irisawa et al. |
| 6,713,030 | B1 | 3/2004 | Chandler et al. |
| 6,732,507 | B1 | 5/2004 | Stanglmaier et al. |
| 6,735,940 | B2 | 5/2004 | Stroia et al. |
| 6,820,417 | B2 | 11/2004 | May et al. |
| 6,832,473 | B2 * | 12/2004 | Kupe et al. .................... 60/286 |
| 6,843,054 | B2 | 1/2005 | Taylor, III et al. |
| 6,845,610 | B2 * | 1/2005 | Shiino et al. ................. 60/286 |
| 6,976,353 | B2 * | 12/2005 | Daniel et al. .................. 60/275 |
| 6,996,975 | B2 * | 2/2006 | Radhamohan et al. ........ 60/286 |
| 7,000,382 | B2 * | 2/2006 | Lee et al. ...................... 60/286 |
| 2002/0054844 | A1 | 5/2002 | Pfeifer et al. |
| 2003/0074888 | A1 | 4/2003 | Jobson et al. |
| 2003/0074893 | A1 | 4/2003 | Webb et al. |
| 2003/0136115 | A1 | 7/2003 | Abet et al. |
| 2003/0177763 | A1 | 9/2003 | Twigg et al. |
| 2003/0206845 | A1 | 11/2003 | Wu et al. |
| 2003/0226350 | A1 | 12/2003 | Liu |
| 2004/0018132 | A1 | 1/2004 | Bartley et al. |
| 2004/0040287 | A1 | 3/2004 | Beu et al. |
| 2004/0050037 | A1 | 3/2004 | Betta et al. |
| 2004/0052693 | A1 | 3/2004 | Crane, Jr. et al. |
| 2004/0076565 | A1 | 4/2004 | Gandhi et al. |
| 2004/0115111 | A1 | 6/2004 | Twigg |
| 2004/0139737 | A1 | 7/2004 | Binder et al. |
| 2004/0175315 | A1 | 9/2004 | Brisley et al. |
| 2004/0216451 | A1 | 11/2004 | LaBarge et al. |
| 2005/0022450 | A1 | 2/2005 | Tan et al. |

FOREIGN PATENT DOCUMENTS

| | | |
|---|---|---|
| EP | 1 027 919 A | 8/2000 |
| EP | 1 211 394 A | 6/2002 |
| FR | 2 790 789 A | 9/2000 |
| WO | WO 03/048536 A | 6/2003 |
| WO | WO 2004/612728 A1 | 7/2004 |
| WO | WO 2004/090296 A1 | 10/2004 |

* cited by examiner

HYBRID CATALYST SYSTEM FOR EXHAUST EMISSIONS REDUCTION

FIELD OF THE INVENTION

The present invention relates to the field of pollution control devices for internal combustion engines, especially diesel engines and lean burn gasoline engines.

BACKGROUND OF THE INVENTION $NO_x$ emissions from vehicles with internal combustion engines are an environmental problem recognized worldwide. Several countries, including the United States, have long had regulations pending that will limit $NO_x$ emissions from vehicles. Manufacturers and researchers have put considerable effort toward meeting those regulations. In conventional gasoline powered vehicles that use stoichiometric fuel-air mixtures, three-way catalysts have been shown to control $NO_x$ emissions. In diesel powered vehicles and vehicles with lean-burn gasoline engines, however, the exhaust is too oxygen-rich for three-way catalysts to be effective.

Several solutions have been proposed for controlling NOx emissions from diesel powered vehicles and lean-burn gasoline engines. One set of approaches focuses on the engine. Techniques such as exhaust gas recirculation and homogenizing fuel-air mixtures can reduce NOx emissions. These techniques alone, however, will not eliminate NOx emissions. Another set of approaches remove NOx from the vehicle exhaust. These include the use of lean-burn $NO_x$ catalysts, lean $NO_x$ traps (LNTs), and selective catalytic reduction (SCR).

Lean-burn NOx catalysts promote the reduction of $NO_x$ under oxygen-rich conditions. Reduction of NOx in an oxidizing atmosphere is difficult. It has proved challenging to find a lean-burn $NO_x$ catalyst that has the required activity, durability, and operating temperature range. Lean-burn $NO_x$ catalysts also tend to be hydrothermally unstable. A noticeable loss of activity occurs after relatively little use. Lean burn NOx catalysts typically employ a zeolite wash coat, which is thought to provide a reducing microenvironment. The introduction of a reductant, such as diesel fuel, into the exhaust is generally required and introduces a fuel economy penalty of 3% or more. Currently, peak NOx conversion efficiency with lean-burn catalysts is unacceptably low.

LNTs are NOx adsorbers combined with catalysts for NOx reduction. The adsorber removes NOx from lean exhaust. Periodically, the adsorber is regenerated by introducing a reducing environment. In the reducing environment, NOx desorbs and is reduced over the catalyst. The adsorbant is generally an alkaline earth oxide adsorbant, such as $BaCO_3$ and the catalyst can be a precious metal, such as Ru.

SCR involves the reduction of NOx by ammonia. The reaction takes place even in an oxidizing environment. The NOx can be temporarily stored in an adsorbant or ammonia can be fed continuously into the exhaust. SCR can achieve NOx reductions in excess of 90%, however, there is concern over the lack of infrastructure for distributing ammonia or a suitable precursor. SCR also raises concerns relating to the possible release of ammonia into the environment.

U.S. Pat. No. 6,560,958 describes an LNT system in which hydrogen-rich synthesis gas (syn gas), including $H_2$ and CO, is used as a reductant to regenerate the adsorber. The syn gas is produced from diesel fuel in a plasma converter. Periodically, the adsorber is taken offline from the exhaust system and supplied with the syn gas. A dual adsorber system is also described.

U.S. Pat. No. 6,732,507 describes a hybrid exhaust treatment system using an LNT and an SCR reactor in series. The SCR reactor captures ammonia produced by the LNT during regeneration and uses the captured ammonia to increase the extent of NOx conversion.

There continues to be a long felt need for reliable, affordable, and effective systems for removing NOx from the exhaust of diesel and lean-burn gasoline engines.

SUMMARY OF THE INVENTION

The following presents a simplified summary in order to provide a basic understanding of some aspects of the invention. This summary is not an extensive overview of the invention. The primary purpose of this summary is to present some concepts of the invention in a simplified form as a prelude to the more detailed description that is presented later.

One aspect of the invention relates an exhaust treatment system having an SCR reactor downstream of an NOx adsorber in which syn gas from a fuel reformer is used to regenerate the NOx adsorber. Preferably, the NOx adsorber has a catalyst and functions to reduce NOx during regeneration. Syn gas from a fuel reformer improves the efficiency of the regeneration cycle as compared to injecting fuel directly into the exhaust system. The SCR reactor further enhances conversion by capturing ammonia produced during regeneration and using the ammonia to reduce NOx during lean operation.

Another aspect of the invention relates to an exhaust treatment system having an SCR reactor downstream of an LNT and an ammonia source separate from the LNT. An LNT will produce some ammonia, but a separate ammonia source can simplify achieving high NOx conversions. The ammonia demand is considerably less than in a pure SCR system and the control system can be simplified by targeting conversion of less than all the NOx escaping the LNT. In one embodiment, the ammonia source comprises an ammonia plant that produces ammonia from a reaction between NOx extracted from a partial exhaust stream and syn gas obtained from a fuel reformer.

A further aspect of the invention relates to an exhaust system comprising first and second LNTs and one or more valves for selectively directing the exhaust into one or the other LNT. The system further comprises one or more SCRs downstream of the LNTs. This system can be used to reduce the fuel penalty associated with regeneration and allows the LNTs to be regenerated with higher reductant concentrations and longer residence times. In a preferred embodiment, the exhaust streams of the LNTs are unified and lead to an oxidation catalyst. This arrangement allows excess reductants to be oxidized without having to inject air or another oxygen source into the exhaust.

A still further aspect of the invention relates to a device that can be used to implement the foregoing. The device comprises first and second NOx adsorbers contained in a single housing and one or more valves for selectively directing the exhaust into one or the other adsorber. The one or more valves can be a simple damper. This aspect of the invention provides a simple, compact, and economic method of implementing dual adsorber-based exhaust treatment systems. Another aspect of the invention relates to coating a moving part in an exhaust system with an oxidation catalyst to mitigate fouling.

Additional aspects of the invention relate to control of LNT/SCR exhaust treatment systems. According to one of these aspects, an ammonia concentration between an LNT and an SCR reactor is measured and used to determine when to terminate a regeneration cycle. Another of these aspect relates to maintaining an estimate of an amount of ammonia adsorbed in the SCR reactor and selectively initiating regeneration of the LNT based on the estimate, whereby regeneration can begin before the ammonia in the LNT is exhausted. This can reduce or prevent NOx breakthrough during the regeneration cycle. A related aspects of the invention involves selectively initiating regeneration based on an NOx concentration measured between an LNT and an SCR reactor. A further aspect of the invention relates to beginning regeneration based on an estimate of the amount of NOx adsorbed in the LNT. In one embodiment, the regeneration cycle is initiated at a point where the LNT is substantially below its NOx storage capacity, whereby the fraction of NOx converted to ammonia during regeneration is substantially greater than it would be if regeneration were postponed until the LNT was closer to saturation. A still further aspect of the invention relates to providing feedback control over the rate at which reductant is supplied during regeneration. The reductant supply rate can be maximized to reduce regeneration time, reduce the fuel penalty, and increase ammonia production subject to limits on the amount of reductant allowed to escape the LNT.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
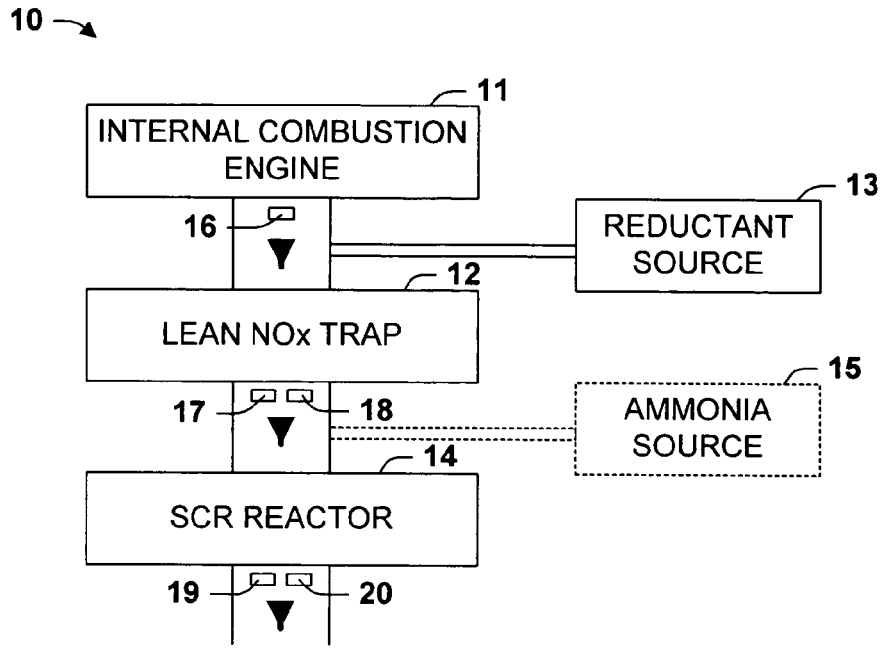
FIG. 1 is a schematic illustration of a vehicle used as an aide in describing several aspects of the present invention.

FIG. 1 is a schematic illustration of a vehicle 10 provided to aide in the description of several aspects of the present invention. The vehicle 10 includes an internal combustion engine 11, a lean NOx trap (LNT) 12, a selective catalytic reduction (SCR) reactor 14, a reductant source 13, an optional ammonia source 15, and sensors 16–20. The vehicle 10 typically produces lean exhaust. The LNT 12 adsorbs NOx from the lean exhaust. From time to time, the exhaust is made rich by injecting a reductant from the reductant source 13. Rich exhaust causes NOx to desorb from the LNT 12. Some of the NOx escapes the LNT, some is reduced to $N_2$, and some is reduced to $NH_3$.

NOx escaping from the LNT during regeneration and NOx not adsorbed by the LNT during lean operation passes through to the SCR reactor 14. In the SCR reactor 14, some of this NOx is reduced by reaction with $NH_3$. The $NH_3$ can be $NH_3$ produced in the LNT 12 and/or $NH_3$ supplied from the optional ammonia source 15. The SCR reactor 14 catalyzes the reaction with ammonia and generally has the capacity to adsorb and store excess ammonia. The sensors 16–20 typically measure concentrations and are optionally provided and used to control one or more of the time to initiate a regeneration cycle, the time to terminate a regeneration cycle, the supply rate of reductant during a regeneration cycle, and the supply rate of ammonia from ammonia source 15, where appropriate. Additional control information typically includes the temperature of the LNT 12, the temperature of the SCR reactor 13, and sometimes vehicle operating information (such as speed and torque) obtained from an engine control unit (not shown). The control functions can be implemented by the engine control unit or by a separate controller that communicates with the engine control unit.

The vehicle 10 is typically powered by a fossil fuel such as diesel, gasoline, natural gas, or propane. The fuel is burned in the internal combustion engine 11 to produce an exhaust comprising NOx. $NO_x$ includes NO, $NO_2$, $N_2O$, and $N_2O_2$. Generally the exhaust is lean, meaning that it contains substantially more oxygen than would be required to combust any hydrocarbons the fuel contains. Typically, lean exhaust contains 3–5% oxygen.

A lean NOx trap (LNT) comprises a NOx adsorption bed and a catalyst effective for reducing NOx in a reducing environment. Generally, the catalyst is provided in the NOx adsorption bed although the catalyst can optionally be provided in a separate bed downstream of the adsorption bed. The adsorption bed comprises an effective amount of an adsorbent for NOx in an oxidizing (lean) environment. The lean NOx trap either desorbs and/or reduces NOx in a reducing environment, provided that the lean NOx trap is in an appropriate temperature range.

The adsorption bed can comprise any suitable adsorbant material. Examples of adsorbant materials include molecular sieves, such as zeolites, alumina, silica, and activated carbon. Further examples are oxides, carbonates, and hydroxides of alkaline earth metals such as Mg, Ca, Sr, and Be or alkali metals such as K or Ce. Still further examples include metal phosphates, such as phoshates of titanium and zirconium.

Molecular seives are materials having a crystalline structure that defines internal cavities and interconnecting pores of regular size. Zeolites are the most common example. Zeolites have crystalline structures generally based on atoms tetrahedrally bonded to eachother with oxygen bridges. The atoms are most commonly aluminum and silicon (giving aluminosilicates), but P, Ga, Ge, B, Be, and other atoms can also make up the tetrahedral framework. The properties of a zeolite may be modified by ion exchange, for example with a rare earth metal or chromium. Preferred zeolites generally include rare earth zeolites and Thomsonite. Rare earth zeolites are zeolites that have been extensively (i.e., at least about 50%) or fully ion exchanged with a rare earth metal, such as lanthanum. For LNTs generally, a preferred adsorbant is an alkaline metal or an alkaline earth metal oxide loaded with a precious metal.

The adsorbant is typically combined with a binder and either formed into a self-supporting structure or applied as a coating over an inert substrate. A binder can be, for example, a clay, a silicate, or a cement. Portland cement can be used to bind molecular sieve crystals. Generally, the adsorbant is most effective when a minimum of binder is used. Preferably, the adsorbant bed contains from about 3 to about 20% binder, more preferably from about 3 to about 12%, most preferably from about 3 to about 8%.

Adsorbant and catalyst beds according to the present invention are generally adapted for use in vehicle exhaust systems. Vehicle exhaust systems create restriction on weight, dimensions, and durability. For example, an adsorption bed for a vehicle exhaust systems must be reasonably resistant to degradation under the vibrations encountered during vehicle operation.

Beds that have an adsorbant function tend to be large in comparison to beds that have only a catalytic function. To limit the total mass, the adsorbant bed preferably comprises a high loading of adsorbant per unit bed mass. Preferably, an adsorbant bed comprises at least about 40% adsorbant by weight. The weight of an adsorbant bed includes any inert substrate and any binders, but does not include any housing. Preferably an adsorbant bed comprises at least about 20% adsorbant by volume.

Adsorbant and catalyst beds are optionally provided with mechanisms for heating and/or cooling. For example, a bed can be permeated with heat-exchange passages in fluid isolation from the passages provided for adsorbed and desorbed gases. A hot or cold fluid is circulated through the heat-exchange passages to heat or cool the adsorber. A cooling fluid could be, for example, engine coolant or ambient air. A heating fluid could be, for example, hot exhaust or a fluid that draws heat from hot exhaust or a heat-producing device such as an ammonia synthesis reactor, a fuel reformer, or an adsorber. Another option is electrical resistance heating. Where a bed includes a metal substrate, the metal substrate can be used as an electrical resistance heater. A bed can also be permeated by wires for electrical resistance heating.

An adsorbant or catalyst bed can have any suitable structure. Examples of suitable structures may include monoliths, packed beds, and layer screening. A packed bed is preferably formed into a cohesive mass by sintering the particles or adhering them with a binder. When the bed has an adsorbant function, preferably any thick walls, large particles, or thick coatings have a macro-porous structure facilitating access to micro-pores where adsorption occurs. A macro-porous structure can be developed by forming the walls, particles, or coatings from small particles of adsorbant sintered together or held together with a binder.

Preferably an NOx adsorption bed has a large capacity for adsorbing a NOx species at a typical adsorption temperature and exhaust partial pressures. Preferably, the adsorbant can adsorb at least about 3% of a NOx species by weight adsorbant at a typical adsorption temperature and 1 torr partial pressure of the NOx species, more preferably at least about 5% by weight adsorbant, and still more preferably at least about 7% by weight adsorbant. The weight of adsorbant does not include the weight of any binders or inert substrates.

The LNT 12 comprises a catalyst for the reduction of NOx in a reducing environment. The catalyst can be, for example, one or more precious metals, such as Au, Ag, and Cu, group VIII metals, such as Pt, Pd, Ru, Ni, and Co, Cr, Mo, or K. A typical catalyst includes Pt and Rh, although it may be desirable to reduce or eliminate the Rh to favor the production of $NH_3$ over $N_2$. Effective operating temperatures are generally in the range from about 200 to about 450° C. Lower temperatures may also be desirable in terms of favoring the production of $NH_3$ over $N_2$.

The reductant source 13 can supply any suitable reductant. Examples of suitable reductants include synthesis gas (syn gas), hydrocarbons, and oxygenated hydrocarbons. Syn gas includes $H_2$ and CO. The reductant can be a fuel for the internal combustion engine 11. The fuel can be injected into the exhaust. Optionally, the internal combustion engine 11 can be run rich to provide the reductant.

Where the reductant source 13 is not the internal combustion engine 11, it is typically a fuel reformer producing simple hydrocarbons, such as syn gas. Simple hydrocarbons are generally more reactive than more complex hydrocarbons in the LNT 12. A fuel reformer can be a catalytic reformer, a steam reformer, an autothermal reformer, or a plasma reformer. For purposes of the present invention, a reformer catalyst is one that, in comparison to an oxidation catalyst such as Pt, Pd, or an oxide of a transition metal such as $MnO_2$, with a feed of diesel fuel and lean exhaust, favors the production of CO and $H_2$ (syn gas) and small hydrocarbons over complete oxidation of the diesel fuel to form $CO_2$ and $H_2O$. In particular, the production of relatively large amounts of $H_2$ is the hallmark of a reformer catalyst. Examples of reformer catalysts include oxides of Al, Mg, and Ni, which are typically combined with one or more of CaO, $K_2O$, and a rare earth metal such as Ce to increase activity. A reformer would generally be supplied with a fuel for the internal combustion engine 11. The reformer would also be supplied with an oxygen source, such as air or lean exhaust. Lean exhaust can be drawn from a high pressure portion of the exhaust system, such as from the manifold upstream of a turbine used in a turbo charge system.

Figure 2:
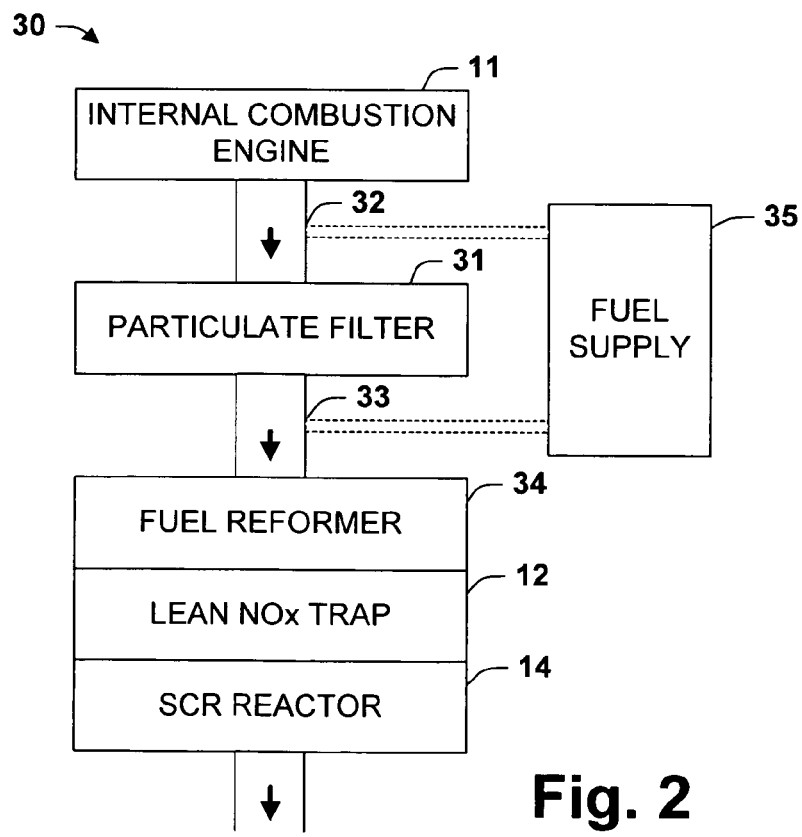
FIG. 2 is a schematic illustration of a vehicle according to one aspect of the present invention.

A fuel reformer is optionally placed directly in the exhaust stream. FIG. 2 is a schematic illustration of a vehicle 30 in which a fuel reformer 34 is placed upstream of the LNT 12. During regeneration, fuel from a fuel source 35 is injected into the exhaust. Two possible injection points are shown. The first injection point 32 is upstream of a particulate filter 31. The particulate filter 31 generally contains an oxidation catalyst and will oxidize a portion of the fuel. The second injection point 33 is downstream of the particulate filter 31. Optionally, both injection points are used, with the injection at point 32 being intended to consume excess oxygen and the injection at point 33 being intended to supply sufficient fuel to regenerate the LNT 12.

An SCR reactor is a reactor having an effective amount of catalyst for the reaction of NOx with $NH_3$ to reduce NOx to $N_2$ in lean exhaust. Examples of SCR catalysts include oxides of metals such as Cu, Zn, V, Cr, Al, Ti, Mn, Co, Fe, Ni, Pd, Pt, Rh, Rd, Mo, W, and Ce, zeolites, such as ZSM-5 or ZSM-11, substituted with metal ions such as cations of Cu, Co, Ag, Zn, or Pt, and activated carbon. Reaction can be obtained at relatively low temperatures, for example, temperatures in the range from about 230 to about 450° C.

Where the ammonia source 15 is provided, it can be any suitable ammonia source. The ammonia source 15 can be, for example, a reservoir of ammonia, ammonium carbomate, or urea. Ammonia can be generated on the vehicle 10 by an ammonia plant that forms ammonia from $H_2$ and $N_2$ or from $H_2$ and NOx. $N_2$ can be obtained from air and $H_2$ can be produced by a fuel reformer. Ammonia, whatever its source, is optionally stored in one or more adsorption beds, such as molecular sieve adsorption beds, and desorbed as needed.

Figure 3:
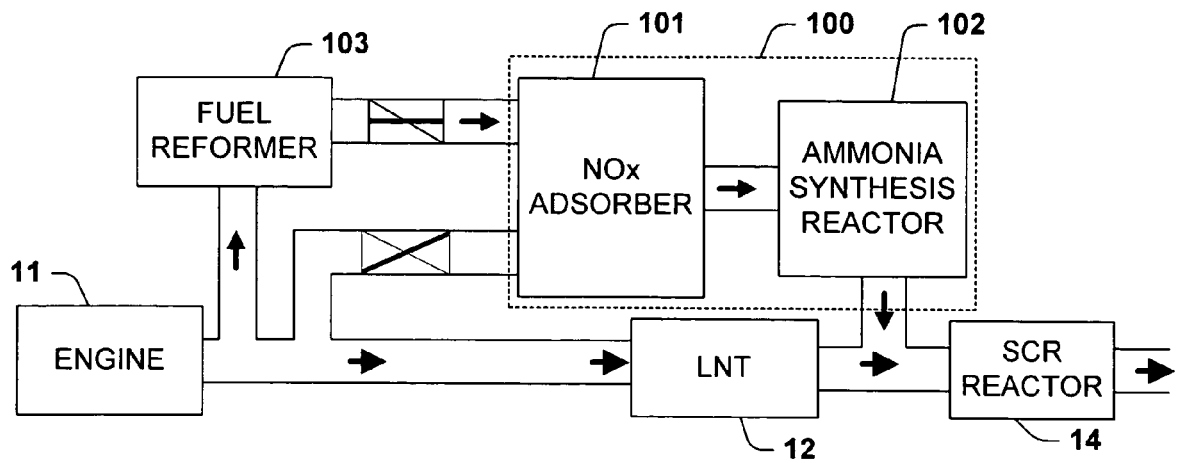
FIG. 3 is a schematic illustration of a vehicles with an ammonia plant according to another aspect of the present invention.

FIG. 3 is a schematic illustration of a vehicle with an ammonia plant 100 according to one aspect of the invention. The ammonia plant 100 comprises an NOx adsorber 101 and an ammonia synthesis reactor 102. The adsorber 101 receives a partial exhaust stream from the internal combustion engine 11. Once the NOx concentration has increased to a sufficient level, the adsorber 101 is supplied with a reductant to initiate ammonia production. The reductant is preferably syn gas from a fuel reformer 103. The reductant causes desorption from the adsorber 101. The reductant and the desorbed NOx react in the reactor 102 to produce ammonia. Optionally, the partial exhaust flow is interrupted during ammonia production, whereby ammonia production can take place in a substantially oxygen free environment. Optionally, the adsorber 101 is an LNT with an appropriate catalyst. Optionally, the reactor 102 is combined with the adsorber 101 by distributing an appropriate catalyst in the adsorber 101.

Appropriate catalysts for ammonia synthesis include precious metals, such as Au, Ag, and Cu, group VIII metals, such as Pt, Pd, Ru, Ir, Ni, and Co, Cr, Mo, or K. The catalysts can be combined, for example Au with Pt, Pd, or Ru. The catalyst can be supported on a zeolite, such as Y zeolite, beta zeolite, mordenite, and ZSM-5, or a metal oxide, such as $Fe_2O_3$, $Al_2O_3$, ZnO, $ZrO_2$, $TiO_2$, $MnO_2$, and $CeO_2$. A preferred catalyst, giving high conversions at low temperatures in an oxygen-free environment, is Au on a metal oxide support, especially an $Fe_2O_3$ or $Al_2O_3$ support. High conversions can be obtained in the temperature range from about 150 to about 300° C. Rather than, or in addition to, a catalyst, the reactor 102 can provide a plasma discharge to induce the ammonia-forming reaction.

The ammonia source 15 enables a method of obtaining very high NOx conversion. The NOx and $NH_3$ rates from LNT 12 can be monitored. To the extent the ammonia rate from the LNT 12 is less than the NOx rate, the ammonia source 15 can provide additional ammonia as needed to convert the NOx to $N_2$ in the SCR 14. Because most NOx is already converted in the LNT 12, in one embodiment the reductant source 15 is controlled to target 60 to 95% conversion of the NOx passing from the LNT 12. By targeting less than 100% conversion, ammonia slip can be greatly reduced. Where excess ammonia is temporarily supplied, it will generally be stored by adsorption in the SCR 14. In another embodiment, the LNT 12 is operated in a manner that produces little ammonia and the ammonia rate from the LNT 12 need not be measured.

In one embodiment, the LNT 12 is regenerated periodically. For example, the reductant can be injected for 5 seconds every 30 seconds. The reductant injection contains sufficient reductant to consume all the free oxygen with enough reductant left over to provide a target concentration of reductant. The reaction of free oxygen can take place either before the LNT or in the LNT. In one embodiment, the reaction with oxygen takes place in a fuel reformer provided in the exhaust stream. In another embodiment, the reductant is injected in two parts. A first part is a fuel directly injected into the exhaust to consumer excess oxygen. A second part is syn gas, which is less efficient for consuming excess oxygen, but more efficient for reducing NOx.

When the LNT 12 is regenerated periodically, setting the reductant injection rate involves measuring or estimating the flow rate of the exhaust and its oxygen concentration. The flow rate can be determined from engine operating conditions, which are typically monitored by the engine control unit. Alternatively, the flow rate can be determined from measurements of either the fuel flow rate or the air flow rate to the engine 10. A sensor can be used to measure the exhaust flow rate directly. The oxygen concentration in the exhaust can either be estimated from the engine operating conditions or measured with an oxygen sensor.

As opposed to a simple periodic regeneration scheme, the invention in several of its aspects contemplates control over one or more of the following parameters: the time at which a regeneration cycle is initiated, the duration of a regeneration cycle, and the reductant concentration during a regeneration cycle.

A method of determining when to initiate a regeneration cycle that is likely contemplated in prior art systems that combine LNTs with SCR reactors involves measuring the NOx concentration downstream of the SCR reactor. When this concentration exceeds a target level, regeneration begins.

One aspect of the invention improves over this method by initiating regeneration sooner. According to this aspect of the invention, an estimate for the amount of ammonia stored by adsorption in the SCR reactor 14 is maintained. Regeneration begins when the stored ammonia drops to a target level.

During regeneration, NOx desorbs from the LNT 12. Particularly during the first part of the regeneration cycle, some of this NOx escapes the LNT 12 un-reacted. If the ammonia in the SCR reactor 14 is depleted entirely prior to regeneration, as in the prior art, the escaping NOx is released into the atmosphere. According to the present invention, however, regeneration begin while ammonia remains in the SCR 15. This ammonia can reduce all or part of the escaping NOx.

Implementing this control system generally involves measuring ammonia and NOx concentrations between the LNT 12 and the SCR reactor 14. The SCR reactor 14 adsorbs ammonia. Unless the SCR reactor 14 becomes saturated, the amount of ammonia in the SCR reactor 14 increases by the ammonia flow into the reactor. The amount of ammonia decreases by reaction with NOx. The decrease is in proportion to the NOx flow rate, optionally modified by a conversion efficiency.

The estimate can be updated by feedback control from a sensor located downstream of the SCR reactor 14. If NOx breakthrough is detected, the adsorbed ammonia amount can be reset to zero. If ammonia slip is detected, the adsorbed ammonia can be reset to an amount reflecting saturation of the SCR reactor 14. Optionally, whenever NOx breakthrough or ammonia slip unexpectedly occurs, a conversion efficiency factor for the reaction of NOx with ammonia in the SCR reactor 14 can be modified, whereby subsequent estimates for the ammonia concentration can be made more accurate.

In one embodiment, the adsorbed ammonia at the time of regeneration is targeted to the excess of NOx over ammonia observed during the previous regeneration cycle. The LNT 12 is expected to begin the regeneration cycle emitting more NOx than ammonia. As regeneration continues, the NOx flow rate is expected to decrease and the ammonia flow rate is expected to increase. The excess NOx is the maximum cumulative excess of NOx over ammonia observed over the course of the cycle. The amount of ammonia in the SCR reactor 14 at the time regeneration begins is targeted to the amount required to reduce this excess.

According to another aspect of the invention, the regeneration cycle is commenced early in order to increase the fraction of NOx that reduces to ammonia rather than $N_2$. When an LNT is saturated with NOx, relatively little ammonia production is observed. Over the course of a regeneration cycle for a saturated LNT, as the amount of NOx in the LNT decreases, ammonia production increases. By starting the regeneration cycle prior to saturation, the production of ammonia in favor of $N_2$ can be increased.

In this embodiment, regeneration preferably begins when the LNT 12 is from about 5 to about 50% saturated with NOx, more preferably from about 10 to about 30% saturated with NOx. The degree of saturation can be estimated from measurement of the amount of NOx in the exhaust and a model for the LNT 12's adsorption capacity. This method can result in relatively frequent regeneration cycles, e.g., occurring on average about one every ten seconds or less for a warmed up vehicle driving at a steady rate of 55 mph. In one embodiment, the faction of adsorbed NOx converted to ammonia is at least about 20%. In another embodiment, the fraction is at least about 40%.

Using the foregoing control method, the amount of ammonia released from the LNT 12 may exceed the amount of NOx passing through the LNT 12. This excess ammonia can be used to reduce a stream of exhaust that bypasses the LNT 12. In one embodiment, an LNT 12 controlled in the foregoing manner is used as the optional ammonia source 15.

In another embodiment, regeneration is timed to control a ratio between total ammonia and NOx released by the LNT 12. The ratio may be targeted at one to one (a stoichiometric ratio), whereby the ammonia produced by the LNT 12 is just enough to reduce the NOx passing through to the SCR reactor 14. Preferably, however, the ratio is slightly less, whereby ammonia slip can be avoided. A lesser amount of ammonia is preferably from about 60 to about 95% of a stoichiometric amount. The amount may also be reduced by an efficiency factor accounting for the fact that, depending on the structure, catalyst loading, and temperature of the SCR reactor 14, a significant fraction of the NOx supplied to the SCR reactor 14 may not react with ammonia even when adequate ammonia is available. Feedback control can be used to obtain the target ratio. In particular, the time between regeneration cycles can be shortened to increase ammonia production and lengthened to decrease ammonia production, with the ultimate goal of creating a balance between ammonia production and NOx emission from the LNT 12.

Another aspect of the invention relates to a method of deciding when to terminate a regeneration cycle. In the prior art, a regeneration cycle is set to a fixed time. Typically, the adsorption capacity of the LNT is known and the amount of reductant required to regenerate the LNT is considered known, however, according to this aspect of the present invention, feedback control is used to determine when to conclude a regeneration cycle. In a preferred embodiment, a regeneration cycle is terminating according to measurements of the ammonia concentration downstream of the LNT 12.

As a regeneration cycle progresses, the ammonia concentration downstream of an LNT first increases, then decreases. The regeneration cycle can be terminated at any recognizable point in the ammonia concentration curve. Most preferably, the regeneration cycle is ended upon the ammonia concentration falling below a target value following a peak. As the ammonia concentration is falling, progressively more unused reductant is slipping through the LNT 12. Therefore, the target value is a design choice reflecting a trade-off between maximizing ammonia production and minimizing reductant slip.

A further aspect of the invention relates to a method of controlling the rate at which reductant is injected. In the prior art, the reductant injection rate typically targeted a particular equivalence ratio. An equivalence ratio is based on the fuel-air mixture as supplied to the engine 11, with a stoichiometric ratio having an equivalence ratio of one. Additional reductant injected into the exhaust downstream of the engine 11 is figured into the equivalence ratio just as if it were supplied to the engine 11.

According to this aspect of the present invention, the reductant injection rate is maximized subject to a limit on reductant breakthrough. Generally, increasing the equivalence ratio increases the ammonia production rate and minimizes the regeneration time. Where the reductant is injected into the exhaust, reducing the regeneration time reduces the fuel penalty. During regeneration, reductant must be supplied to consume free oxygen in the exhaust. This reductant is in excess of the reductant used to reduce NOx. The total amount of oxygen to consume depends on the length of the regeneration cycle. If the regeneration cycle is shorter, the molar flow of oxygen that must be reduced is less.

In a preferred embodiment, the reductant breakthrough rate is determined by an oxidizable species sensor downstream of the SCR reactor 14. All oxidizable species can be considered reductant. For purposes of control, the breakthrough rate is preferably expressed as a fraction of the injection rate in excess of the injection rate required to consume free oxygen. For example, if doubling the excess injection rate over the amount required to consume free oxygen only doubles the breakthrough rate, the fractional conversion of reductant does not decrease at all. In one embodiment, the reductant injection rate is controlled to give from about 50 to about 95% conversion of reductant in excess of the amount required to consume free oxygen, in another embodiment from about 70 to about 90% conversion.

Figure 4:
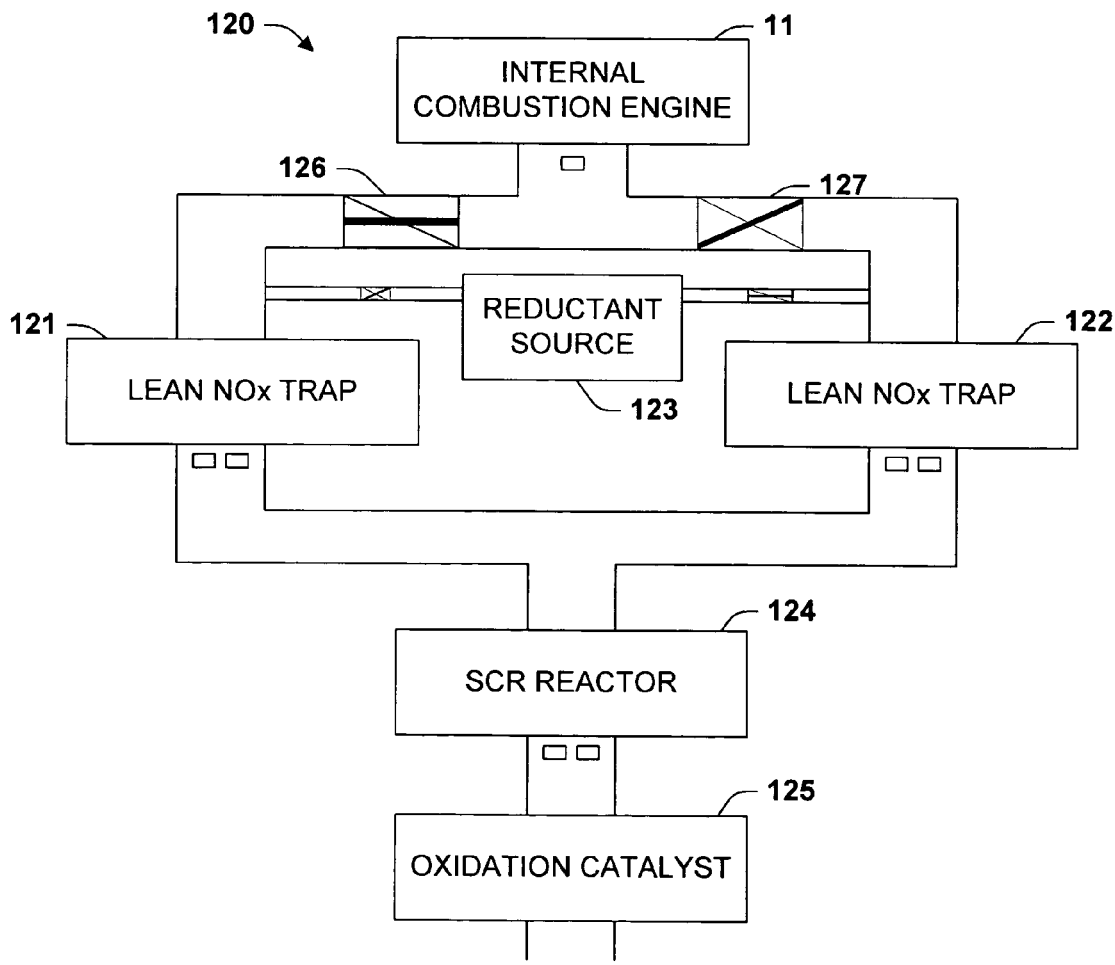
FIG. 4 is a schematic illustration of a vehicle having two LNTs according to a further aspect of the present invention.

Another method of reducing the fuel penalty is to employ a vehicle 120 with a dual adsorber system as schematically illustrated in FIG. 4. The vehicle 120 has a lean NOx trap A 121, a lean NOx trap B 122, a reductant source 123, at least one SCR reactor 124, and an optional diesel oxidation catalyst 125. In this example, the outflows of the NOx traps A 121 and B 122 are unified and supplied to a single SCR reactor 124 and a single oxidation catalyst 125. Optionally the outflows are not unified and treated separately. The valves 126 and 127 selectively direct the exhaust from the internal combustion engine 11 to either one or the other of the lean NOx traps A 121 and B 122. Two valves 126 and 127 are illustrated, although a single three-way valve can be used.

One advantage of the dual adsorber system is that reducing agent does not need to be wasted consuming free oxygen in the exhaust. Another advantage is that the reducing agent does not need to be diluted with the exhaust. This increases the concentration of the reducing agent and thereby the efficiency with which it reacts. A further advantage is that the residence time of the reducing agent in the LNT A 121 and B 122 can be increased. The residence time can be increased both because the residence time is not limited by the exhaust flow rate and because more time can be taken to regenerates the LNTs. A longer residence time allows for a higher conversion efficiency for a given amount of catalyst.

Additional advantages can be realized when the outflows of the LNTs are combined. One advantage is that excess reductant from the LNTs and ammonia slipping from the SCRs can be reduced by the oxidation catalyst 125 without injecting oxygen. In a system that does not have a unified flow, there is no free oxygen in the exhaust downstream of the LNTs during regeneration. Air must be injected or another oxygen source provided to oxidize unconverted hydrocarbons and $NH_3$. With a unified flow, ample oxygen is generally supplied by the exhaust.

To allow a unified flow, the pressure of the reductant injection must be regulated to a level above that of the exhaust at the point where the streams join. This can be accomplished without extra pumps, even when the reductant is syn gas. For example, syn gas can be generated from exhaust drawn from a high pressure point in the exhaust system and fuel drawn from a common rail. The feeds can be reacted while remaining at an elevated pressure.

Figure 5:
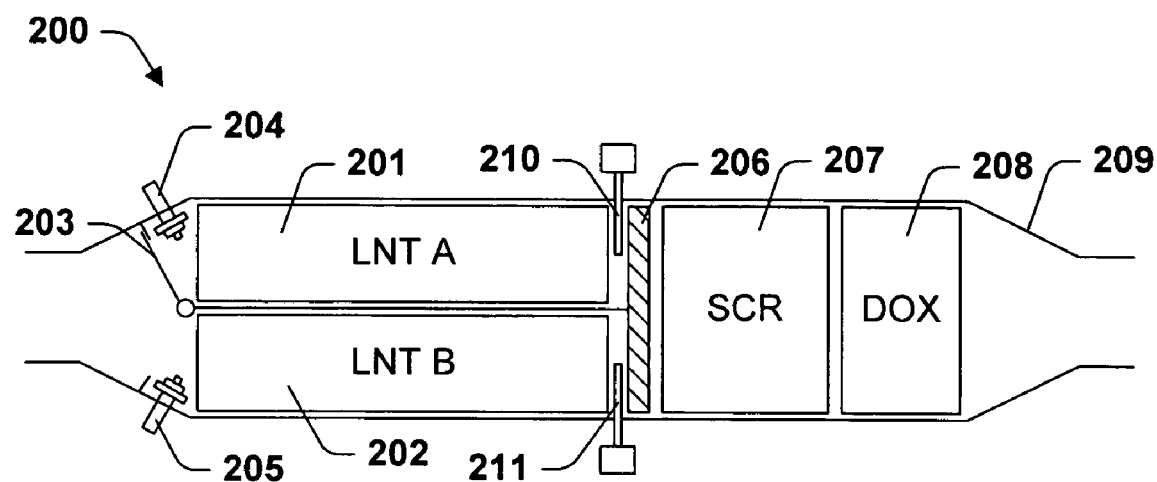
FIG. 5 is an illustration of a device comprising two NOx adsorbers in a single housing according to a further aspect of the present invention.

FIG. 5 is an illustration of a device 200 with twin lean NOx traps A 201 and B 202. The valving for the exhaust is provided by pivoting damper 203. Injection ports 204 and 205 are provided to inject reductant into one or the other of the LNTs A 201 and B 202. The outflows of the LNTs A 201 and B 202 combine after passing through baffling device 206, which is designed to promote mixing of the two streams. The exhaust then passes through an SCR reactor 207 and a diesel oxidation catalyst (DOC) 208. The components are all held in a single housing 209. Sample ports 210 and 211 are provided to sample the outflows of the LNTs A 201 and B 202 respectively for purposes of control. Rather than use sample ports, the sensors can be placed inside the housing 209.

A further aspect of the invention relates to a method of mitigating fouling of a moving part such as the damper 203, particularly around its pivot mechanism. According to this aspect of the invention, a surface of the moving part is provided with an oxidation catalysts. Suitable oxidation catalysts include precious metals, and Pt in particular. The coating facilitates oxidation of soot that might otherwise form a build-up that eventually fouls the moving part.

The invention has been shown and described with respect to certain aspects, examples, and embodiments. While a particular feature of the invention may have been disclosed with respect to only one of several aspects, examples, or embodiments, the feature may be combined with one or more other features of the other aspects, examples, or embodiments as may be advantageous for any given or particular application.

The claims are:

1. A vehicle, comprising:
    an exhaust treatment system, comprising:
        a NOx adsorbant-catalyst adapted to adsorb and store NOx from lean exhaust;
        a conduit configured to channel exhaust to the NOx adsorbant-catalyst, wherein exhaust must pass through the conduit to reach the NOx adsorbant-catalyst during normal operation of the exhaust treatment system;
        a fuel reformer positioned within the conduit, whereby at least the bulk of the exhaust passing through the conduit also passes through the fuel reformer; and
        an ammonia SCR catalyst configured to receive gases desorbed from the NOx adsorbant-catalyst;
        wherein the NOx adsorbant-catalyst functions to generate ammonia during regeneration and the SCR catalyst functions to adsorb ammonia so generated; and
        the SCR catalyst functions, in a period immediately following regeneration of the NOx adsorbant-catalyst, to reduce NOx passing the NOx adsorbant-catalyst by catalyzing reaction of NOx with the adsorbed ammonia;
    a diesel engine; and
    a controller;
    wherein the controller initiates regeneration of the NOx adsorbant-catalyst while the NOx adsorbant-catalyst remains effective for NOx removal in order to increase the fraction of adsorbed NOx that will be converted into ammonia during regeneration as compared to the fraction of adsorbed NOx that would be converted ammonia were regeneration postponed.

2. The vehicle of claim 1, wherein during normal operation the NOx adsorbant-catalyst is regenerated on average once ever ten seconds or less.

3. The vehicle of claim 1, wherein exhaust treatment system is operative to converts at least about 40% of the NOx adsorbed on the NOx adsorbant-catalyst to ammonia.

4. A vehicle, comprising:
    an exhaust treatment system, comprising:
        a NOx adsorbant-catalyst adapted to adsorb and store NOx from lean exhaust;
        a conduit configured to channel exhaust to the NOx adsorbant-catalyst, wherein exhaust must pass through the conduit to reach the NOx adsorbant-catalyst during normal operation of the exhaust treatment system;
        a fuel reformer positioned within the conduit, whereby at least the bulk of the exhaust passing through the conduit also passes through the fuel reformer; and
        an ammonia SCR catalyst configured to receive gases desorbed from the NOx adsorbant-catalyst;
        wherein the NOx adsorbant-catalyst functions to generate ammonia during regeneration and the SCR catalyst functions to adsorb ammonia so generated; and
        the SCR catalyst functions, in a period immediately following regeneration of the NOx adsorbant-catalyst, to reduce NOx passing the NOx adsorbant-catalyst by catalyzing reaction of NOx with the adsorbed ammonia;
    a diesel engine;
    a fuel injector configured to inject diesel fuel into the conduit upstream of the fuel reformer at an adjustable rate; and
    a controller;
    wherein the controller is configured to vary the average diesel fuel injection rate over a time period between the beginning of a regeneration operation and the end of a regeneration operation in order to approach a maximum in the diesel fuel injection rate subject to a limit, whereby the efficiency of regeneration is improved over a constant average fuel injection rate or an injection rate targeted to provide an essentially constant average lambda ratio.

5. The vehicle of claim 4, further comprising:
    a sensor downstream of the NOx adsorbant-catalyst;
    wherein the controller determines the fuel injection rate using feedback from the sensor.

6. A vehicle, comprising:
    an exhaust treatment system, comprising;
        a NOx adsorbant-catalyst adapted to adsorb and store NOx from lean exhaust;
        a conduit configured to channel exhaust to the NOx adsorbant-catalyst, wherein exhaust must pass through the conduit to reach the NOx adsorbant-catalyst during normal operation of the exhaust treatment system;
        a fuel reformer positioned outside the conduit and configured to supply reformate to the NOx adsorbant-catalyst;
        a catalyst positioned within the conduit and adapted to consume excess oxygen in the exhaust using either diesel fuel or part of the reformate; and an ammonia SCR catalyst configured to receive gases desorbed from the NOx adsorbant-catalyst;

wherein the NOx adsorbant-catalyst functions to generate ammonia during regeneration and the SCR catalyst functions to adsorb ammonia so generated; and the SCR catalyst functions, in a period immediately following regeneration of the NOx adsorbant-catalyst, to reduce NOx passing the NOx adsorbant-catalyst by catalyzing reaction of NOx with the adsorbed ammonia;

a diesel engine; and a controller;

wherein the controller initiates regeneration of the NOx adsorbant-catalyst while the NOx adsorbant-catalyst remains effective for NOx removal in order to increase the fraction of adsorbed NOx that will be converted into ammonia during regeneration as compared to the fraction of adsorbed NOx that would be converted ammonia were regeneration postponed.

7. The vehicle of claim 6, wherein during normal operation the NOx adsorbant-catalyst is regenerated on average once ever ten seconds or less.

8. The vehicle of claim 6, wherein exhaust treatment system is operative to converts at least about 40% of the NOx adsorbed on the NOx adsorbant-catalyst to ammonia.

9. A vehicle, comprising:

an exhaust treatment system, comprising;

a NOx adsorbant-catalyst adapted to adsorb and store NOx from lean exhaust;

a conduit configured to channel exhaust to the NOx adsorbant-catalyst, wherein exhaust must pass through the conduit to reach the NOx adsorbant-catalyst during normal operation of the exhaust treatment system;

a fuel reformer positioned outside the conduit and configured to supply reformate to the NOx adsorbant-catalyst;

a catalyst positioned within the conduit and adapted to consume excess oxygen in the exhaust using either diesel fuel or part of the reformate; and an ammonia SCR catalyst configured to receive gases desorbed from the NOx adsorbant-catalyst;

wherein the NOx adsorbant-catalyst functions to generate ammonia during regeneration and the SCR catalyst functions to adsorb ammonia so generated; and the SCR catalyst functions, in a period immediately following regeneration of the NOx adsorbant-catalyst, to reduce NOx passing the NOx adsorbant-catalyst by catalyzing reaction of NOx with the adsorbed ammonia; and a fuel injector configured to inject diesel fuel into the conduit upstream of the fuel reformer at an adjustable rate;

a diesel engine; and a controller;

wherein the controller is configured to vary the average diesel fuel injection rate over a time period between the beginning of a regeneration operation and the end of a regeneration operation in order to approach a maximum in the diesel fuel injection rate subject to a limit, whereby the efficiency of regeneration is improved over a constant average fuel injection rate or an injection rate targeted to provide an essentially constant average lambda ratio.

10. The vehicle of claim 9, further comprising:

a sensor downstream of the NOx adsorbant-catalyst;

wherein the controller determines the fuel injection rate using feedback from the sensor.

\* \* \* \* \*